United States Patent
Searles et al.

(10) Patent No.: US 9,274,938 B2
(45) Date of Patent: *Mar. 1, 2016

(54) DYNAMIC RAM PHY INTERFACE WITH CONFIGURABLE POWER STATES

(71) Applicant: ADVANCED MICRO DEVICES, INC., Sunnyvale, CA (US)

(72) Inventors: Shawn Searles, Austin, TX (US); Nicholas Todd Humphries, Austin, TX (US); Brian W. Amick, Bedford, MA (US); Richard W. Reeves, Westborough, MA (US); Hanwoo Cho, Acton, MA (US); Ronald L. Pettyjohn, Concord, MA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 470 days.

This patent is subject to a terminal disclaimer.

(21) Appl. No.: 13/737,306

(22) Filed: Jan. 9, 2013

(65) Prior Publication Data
US 2013/0124806 A1 May 16, 2013

Related U.S. Application Data

(63) Continuation of application No. 12/910,412, filed on Oct. 22, 2010, now Pat. No. 8,356,155.

(60) Provisional application No. 61/382,089, filed on Sep. 13, 2010.

(51) Int. Cl.
*G06F 12/00* (2006.01)
*G06F 1/32* (2006.01)
(Continued)

(52) U.S. Cl.
CPC .............. *G06F 12/00* (2013.01); *G06F 1/3275* (2013.01); *G06F 13/1689* (2013.01); *G06F 13/4072* (2013.01); *G06F 13/4086* (2013.01); *Y02B 60/1228* (2013.01)

(58) Field of Classification Search
None
See application file for complete search history.

(56) References Cited

U.S. PATENT DOCUMENTS

| 4,631,659 A | 12/1986 | Hayn et al. |
| 6,401,213 B1 | 6/2002 | Jeddeloh |

(Continued)

FOREIGN PATENT DOCUMENTS

| JP | 2004-528613 A | 9/2004 |
| JP | 2007-241799 A | 9/2007 |

(Continued)

OTHER PUBLICATIONS

Yeon-Jae Jung et al. "A dual-loop delay-locked loop using multiple voltage-controlled delay lines," IEEE Journal of Solid-State Circuits, vol. 36, No. 5, pp. 784-791, May 2001.

(Continued)

*Primary Examiner* — Edward Dudek, Jr.
*Assistant Examiner* — Ralph A Verderamo, III
(74) *Attorney, Agent, or Firm* — Volpe and Koenig, P.C.

(57) ABSTRACT

A physical memory interface (Phy) and method of operating is disclosed. The Phy interface includes command and status registers (CSRs) configured to receive a first power context and second power context. Selection circuitry is configured to switch between the first and second power contexts. A plurality of adjustable delay elements are provided, each having a delay time responsive to the selected power context. A first set of CSRs configured may store the first power context and a second set of CSRs configured may store the second power context. The Phy interface may also include a plurality of drivers each having a selectable drive strength responsive to the selected power context. The Phy interface may also include a plurality of receivers each having a selectable termination impedance responsive to the selected power context. Switching between power contexts may result in adjusting of the delay elements, drive strength and/or termination impedance of one or more drivers/receivers.

20 Claims, 3 Drawing Sheets

(51) Int. Cl.
*G06F 13/16* (2006.01)
*G06F 13/40* (2006.01)

(56) References Cited

U.S. PATENT DOCUMENTS

| | | |
|---|---|---|
| 6,618,791 B1 | 9/2003 | Dodd et al. |
| 6,842,864 B1 | 1/2005 | Barth et al. |
| 8,244,971 B2 | 8/2012 | Rajan et al. |
| 2003/0237056 A1 | 12/2003 | Schoenfeld et al. |
| 2005/0198542 A1 | 9/2005 | Freker et al. |
| 2006/0083093 A1 | 4/2006 | Dover et al. |
| 2006/0261869 A1 | 11/2006 | Gomm et al. |
| 2008/0144408 A1 | 6/2008 | Ware et al. |
| 2009/0244995 A1 | 10/2009 | Searles et al. |

FOREIGN PATENT DOCUMENTS

| | | |
|---|---|---|
| JP | 2007-249738 A | 9/2007 |
| JP | 2010-160724 A | 7/2010 |

OTHER PUBLICATIONS

PCT International Search Report dated Nov. 30, 2011 for International Application No. PCT/US2011/051345, filing date of Sep. 13, 2011.

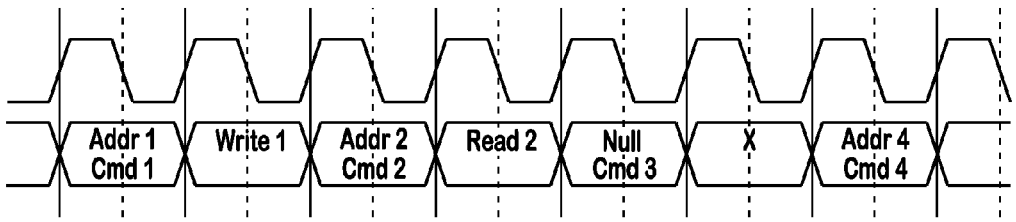

FIG. 3

| Address | Value | Function |
|---|---|---|
| [15:13] | 000 | Chiplet Type: D3Dbyte (9 instances) |
| | 001 | Chiplet Type: D3Clk (4 instances) |
| | 010 | Chiplet Type: D3Cmp (3 instances) |
| | 011 | Chiplet Type: D3MemVref (2 instances) |
| | 100 | Chiplet Type: D3CsOdt (1 instances) |
| | 101 | Chiplet Type: D3AByte1 (1 instances) |
| | 110 | Chiplet Type: D3AByte (1 instances) |
| [12] | 0/1 | When 1, update all registers within the chiplet that match address bits [5,1,0]: when 0 decode all address bits [5:0] |
| [11:8] | 1011-0000 | Instance number of the Chiplet type. Allows up to 12 instances. |
| | 1100 | Broadcast to all ODT Compensation registers matching [7:6] |
| | 1101 | Broadcast to all Driver Compensation registers matching [7:6] |
| | 1110 | Broadcast to all Pre-Driver Compensation registers matching [7:6] |
| | 1111 | Broadcast to all chiplets matching the type field [15:13] |
| [7:6] | 11-00 | Up to four codes that identify the source when broadcasting ([11:8]) compensation information. Each chiplet will have a 2-bit metal strap code that identifies the D3CMP block it is associated with. When a compensation broadcast occurs [7:6] identifies the D3CMP the data was sourced from. |
| [5:0] | 1x_xxxx | DLL register |
| | 0x_xx00 | Drive Strength Register |
| | 0x_xx01 | Driver Compensation Register |
| | 0x_xx10 | Pre-Driver Compensation Register |
| | 0x_xx11 | ODT Compensation Register (D3DBYTE only) |

FIG. 4

DYNAMIC RAM PHY INTERFACE WITH CONFIGURABLE POWER STATES

CROSS REFERENCE TO RELATED APPLICATIONS

This application is a continuation of U.S. patent application Ser. No. 12/910,412, filed Oct. 22, 2010, which claims the benefit of U.S. Provisional Patent Application No. 61/382,089 filed Sep. 13, 2010, which are incorporated by reference as if fully set forth.

FIELD OF INVENTION

This invention relates to memory subsystems including physical layers that directly interface with dynamic random access memory (DRAM) devices.

BACKGROUND

Typical memory systems use either an asynchronous or synchronous clocking scheme to transmit data between the memory controller and the memory device. Synchronous clocking means that the memory device waits for a clock signal before responding to control inputs and is therefore synchronized with the computer's system bus. Synchronous dynamic random access memory (SDRAM) is widely used since such devices typically support higher clock speeds than asynchronous memory devices.

Double data rate (DDR) SDRAM transfers data on both the rising and falling edges of the clock signal. Such memory devices use a lower clock frequency but require strict control of the timing of the electrical data and clock signals. The first version of such devices (DDR1) achieved nearly twice the bandwidth of a single data rate (SDR) SDRAM running at the same clock frequency. DDR2 and DDR3 SDRAM devices are subsequent improvements over DDR1 devices. Regardless of which type of DDR memory is used (DDR1/DDR2/DDR3), a physical interface (Phy) is coupled directly between the memory controller and the DDR SDRAM devices. The Phy interface generally includes circuitry for handling the timing requirements of the DDR SDRAM data strobes. Typical Phy interface implementations provide no mechanism to rapidly adjust memory performance level or demanded power.

SUMMARY

A physical memory interface (Phy) is provided to interface between a memory controller and physical memory devices. A method of controlling the physical memory interface includes responsive to receiving a power context change request, selecting a power context based on the power context change request. And then configuring a plurality of adjustable delay elements to provide timing delays for reading data from and writing data to the memory device, each adjustable delay element having a delay time corresponding to the power context.

In another embodiment, the Phy interface includes a plurality of registers configured to store at least two power contexts and selection circuitry for selecting one of the at least two power contexts. A plurality of adjustable elements is further included for providing varying levels of performance for accessing the memory device. Each adjustable element is configured to a level of performance by a physical memory interface parameter corresponding to the selected power context.

The Phy interface may include a configuration bus that is configured to allow read/write access command and status registers (CSRs). The Phy interface may also be configured to support multiple channels of physical memory devices. The Phy interface may be located in various locations including on a die of a central processing unit (CPU).

BRIEF DESCRIPTION OF THE DRAWINGS

FIG. 3 is a timing diagram showing the address, command (e.g., read, write) and data on the Phy interface configuration bus;
and
FIG. 4 shows a breakdown CSRs addressing.

DETAILED DESCRIPTION OF THE EMBODIMENTS

Figure 1:
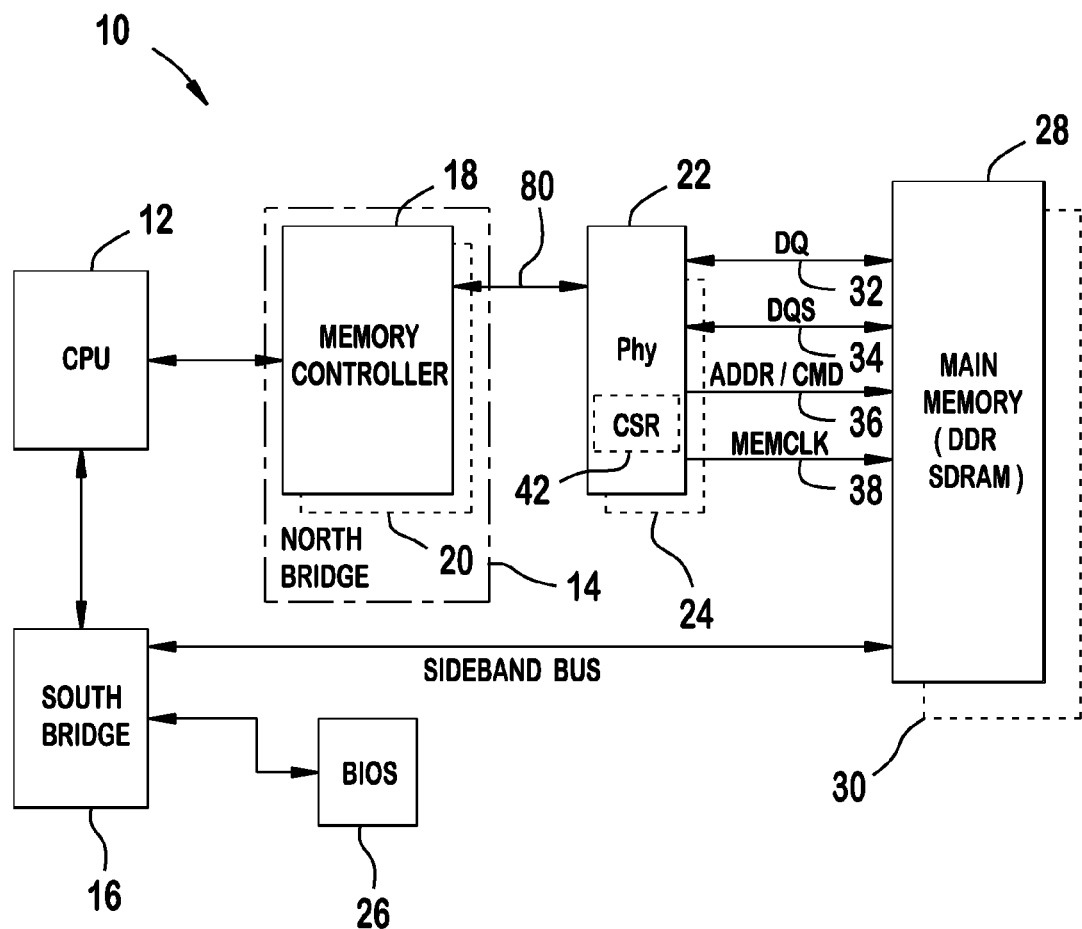
FIG. 1 shows a portion of a typical computer system.

FIG. 1 shows a portion of a computer system 10 including a central processing unit (CPU) 12, a core logic chipset 14, 16 and memory interface 18 to main memory 28. The core logic chipset may be divided between a north bridge 14 (or integrated memory controller) and a south bridge (or I/O controller hub) 16. The memory controller 18 is often located in the north bridge 14. It should be understood that such circuitry may be physically located in a variety of locations such as a single chip or in the CPU. The memory controller 18 generally manages the logical flow of data going to and from main memory 30. Dynamic random access memory also requires periodic refresh signals to maintain the charge in the various memory storage cells. The memory controller 18 typically manages these refresh operations. Depending on the CPU architecture and/or operating system, main memory 30 may transfer data in 32 or 64 bit data units. It should be understood that other size data units may be supported. Some memory systems include multiple channels (e.g., two or more independent memory controllers) as reflected by blocks 20, 24 and 30. For purposes of clarity, the examples contained herein may illustrate only a single memory channel. It should be understood that multiple channels may be used without departing from the scope of this disclosure.

A Phy interface 22 resides between the memory controller 18 and the physical memory devices. The Phy interface is typically located in the central processing unit but may be located elsewhere. For purposes of clarity, the Phy interface 22 is shown as a separate block in FIG. 1. The Phy interface generally includes circuitry for handling the timing requirements of the main memory data strobes. For purposes of this disclosure, the term double data rate (DDR) encompasses DDR1/DDR2/DDR 3 and/or subsequent generations of such memory devices. DDR memory devices typically conform to Joint Electron Devices Engineering Councils (JEDEC) standards. These standards define how DDR memory data is accessed (read), and stored (written). It should be understood that a Phy interface may be constructed to operate with other memory types and/or other memory standards. The interface to a typical DDR SDRAM memory device is accomplished primarily through two signal classes, DQ (data) 32 and DQS (data strobe) 34. Other signals include the memory clock (MEMCLK) 38 as well as address and command signals (shown generally as ADDR/CMD 36). It should be understood that typical memory devices may use additional signals that are not shown in the drawing figures. Such signals have been omitted for purposes of clarity only. For example, power and ground signals are not shown. It should be understood that such signals would be included in a typical implementation.

During a read operation, a DDR SDRAM issues DQ and DQS at the same time, a manner commonly referred to as "edge aligned." In order for the memory controller to correctly acquire the data being sent from the DDR SDRAM, the Phy interface 22 utilizes delay circuitry, such as a delay-locked loop (DLL), to delay the DQS signal so that it may be used to correctly latch the DQ signals during a valid data window or "data eye". Similarly, the Phy interface 22 also utilizes delay circuitry to support the writing of data to the DDR DRAM. For reading data, the DQS 34 must be delayed. For writing data, the DQS and DQ 34, 32 must be delayed. The Phy aligns DQS 34 with the middle of the DQ 32 data eye rather than edge aligned. DQS 34 is delayed for write leveling and to meet the middle-of-data-eye requirements. Other delays may also be used (e.g., for read/write tri-state control of the data bus). The Phy interface 22 includes a plurality of command and status registers (CSRs) 42 that are utilized to control delay timing, drive strengths and a variety of other parameters as described in more detail below. It should be understood that such circuitry may be duplicated on a per channel basis as well.

The Phy interface may also adjust or select transmitter drive strength and receiver termination impedance. Rather than use fixed timing delays, transmitter drive strength and receiver termination impedance, these parameters may be adjusted each time the computer system is turned on. This is typically accomplished with the assistance of a training program. The training program is typically stored in a basic input/output system (BIOS) memory device 26, but it may also be implemented within the device hardware. The training program executes an algorithm during power-on self-test (POST), which determines appropriate timing delays, drive strengths and termination impedances associated with many of the memory interface signals. Theses parameters are saved within the Phy interface in a plurality of registers that define the overall timing of the various signal paths to and from the Phy. In the alternative, these parameters may be stored elsewhere (e.g., in the north bridge 14 or south bridge 16).

Figure 2:
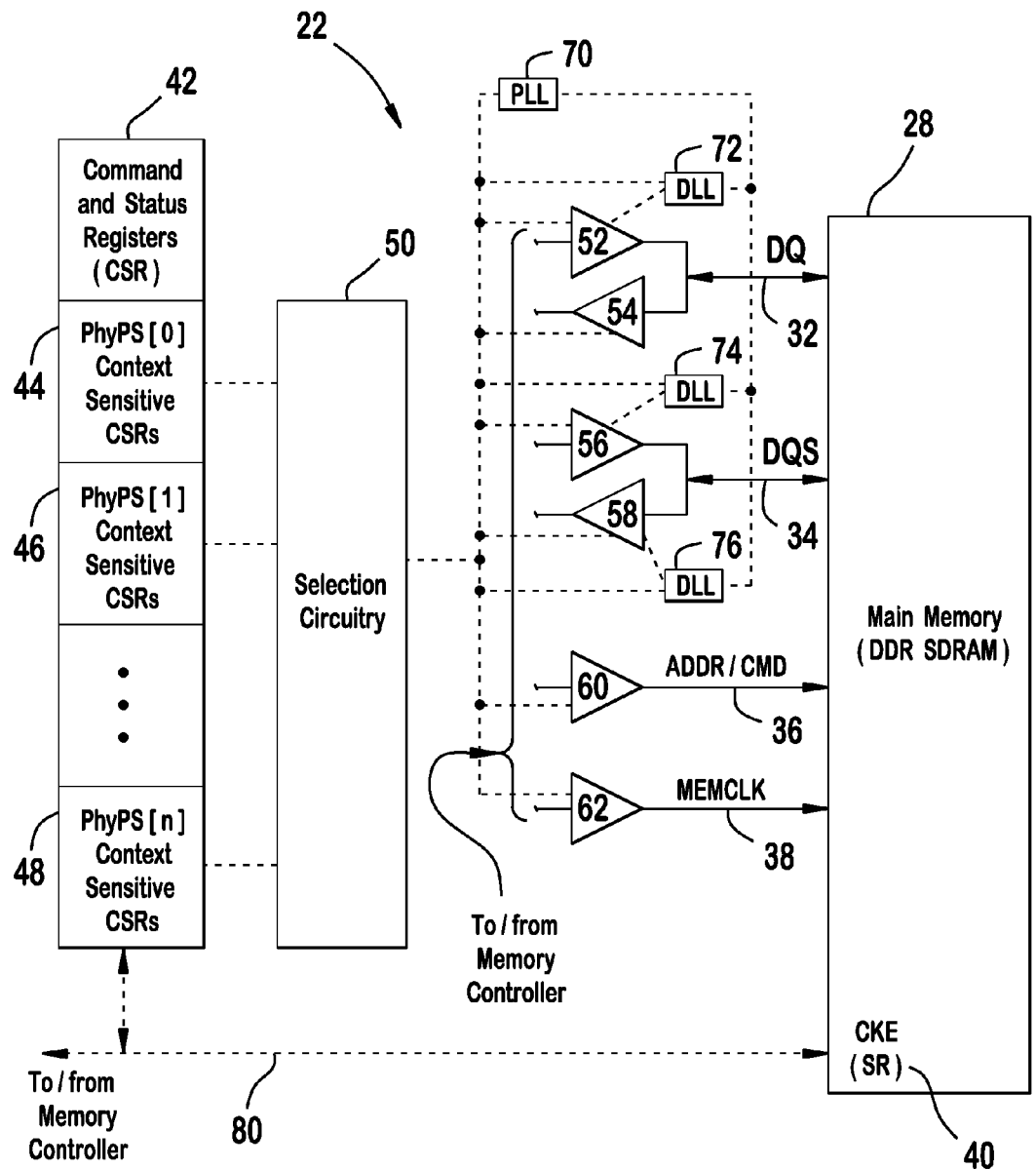
FIG. 2 shows the high level architecture of Phy.

FIG. 2 shows the high level architecture of the Phy interface 22. The Phy interface generally includes a clock source (e.g., PLL 70) and a control interface that includes command and status registers (CSR) 42. The Phy interface 20 provides physical connections for a majority of the pins on a typical memory device such as a dual in-line memory module (DIMM) including DQ 32, DQS 34, address/command lines 36 and clock input 38.

Typical memory devices are also provided with a clock enable (self refresh) input 40. The clock enable input 40 is used to place the memory device in self refresh mode. In this mode, the memory device uses an on-chip timer to generate internal refresh cycles as necessary. External clocks may also be stopped during this time. This input is typically used in connection with power down modes since it allows the memory controller to be disabled without loss of main memory data.

As shown in FIG. 2, the DQ 32 (data) and DQS 34 (strobe) lines are bidirectional. It should be understood that each DIMM will have multiple DQ lines (e.g., 64 data bits) and multiple DQS lines. Each of these lines has an associated driver 52, 56 and receiver 54, 58 in the Phy interface 22. A single driver/receiver pair is shown in FIG. 2 for purposes of clarity. Each driver has a selectable or adjustable drive output. Similarly, each receiver has a selectable or adjustable termination impedance (e.g., on die termination). The DQ and DQS lines 32, 34 are also associated with delay elements such as delay locked loops (DLLs) 72, 74, 76. Adjustments to delay elements (e.g., 70-76), drive strength or termination impedance values are accomplished via programming appropriate values into the proper field of an associated CSR 42 as described in more detail below. The logical connection between CSRs and adjustments in delay elements, drive strength or termination impedance are shown generally in dashed lines.

In this example, drivers 52 and 56 are associated with DLLs 72 and 74 respectively. Receiver 58 is associated with DLL 76. As described above, the DLLs are adjusted to provide the appropriate timing delays for read and write operations. The Phy interface may also be configured to perform read and write operations with or without leveling. During memory write operations to DDR3 DIMMS with leveling, the Phy interface delays the launch of each DQS going to the DIMM such that at each DRAM chip DQS is seen to coalesce with the memory clock 58. During read operations with leveling, the Phy interface may also compensate delays introduced by fly-by topology.

Due to signal integrity issues of operation at higher data rates, the Phy interface may dynamically change the DLL settings on a burst-by-burst (or transaction) basis. The Phy interface may store an optimum tuple of delay settings for DQ and DQS for each DIMM in the system. Depending upon the DIMM being accessed, the Phy interface retrieves the appropriate DLL settings and applies them.

The Phy interface may tailor its demanded power based upon the desired level of performance. It should be understood that the determination of when to change power contexts may come from a variety of sources. For example, the operating system may determine that a context change is desired (e.g., after a set period of inactivity, by user command, time schedule or the like). In the alternative, hardware may be used to determine when a context change is desired. The context change is accomplished by switching between different sets of Phy interface parameters associated with different power states. For example, a high power state (e.g., higher memory speed) and a low power state (e.g., lower memory speed). Each power state has an associated set of Phy interface parameters or context (i.e., delay element settings, drive strengths and termination impedances for each signal line). As described in more detail hereafter, switching between power states may be accomplished in several ways. It should be understood that switching between multiple power states as disclosed herein can be applied to any memory type and is not limited to use with DDR memory as used in the examples below.

In this example, the memory controller 18 may access the CSRs 42 via a 32-bit, time interleaved, uni-directional configuration bus 80. Address and command (e.g., read, write, do nothing) are sent in the first pipestage, followed by data in the second pipestage as shown in FIG. 3. It should be understood that CSRs could be accessed via other communication links.

In this example, the CSR address space is 16 bits wide, allowing for a space of 65,536 unique 16-bit registers. Instead of allowing for such a large space, the address is mapped to allow for the following functions: chiplet identification; intra-chiplet broadcast; compensation broadcast; chiplet instance identification (the D3DBYTE, D3CLK and D3CMP are chiplets that are placed more than once). FIG. 4 shows a breakdown for CSRs addressing.

Only a portion of the CSRs contain values that are relevant to a given power state. In order to facility low latency switching between power states, a set of power context sensitive CSRs are provided for each power state. Returning to FIG. 2, a first set of CSRs are associated with a first power context—PhyPS[0] 44. Another set of CSRs are associated with a second power context—PhyPS[1] 46. It should be understood that additional sets of CSRs may be provided to support more than two power contexts as shown by PhyPS[n] 48. A multiplexer or selection circuitry 50 is provided to select between the different sets of CSRs. The Phy interface also contains CSRs that are not power context sensitive. Such CSRs are applicable in all power states.

A summary of the programmable fields for each CSR in each PhyPS is shown below in Table 1.

TABLE 1

| No. | Description |
|---|---|
| 1 | DDR PLL rate; |
| 2 | DLL (Delay Locked Loop) frequency specific programming; |
| 3 | DQS (strobe bit) Drive Strength (DS); |
| 4 | DQ (date bit) DS |
| 5 | MemClk DS |
| 6 | Address & Command (Addr, Bank, RAS, CAS, WE, AddrParity) DS |
| 7 | Chip select (Cs) & On-die termination (Odt) DS |
| 8 | Clock Enable (Cke) DS |
| 9 | ProcOdt strength |
| 10 | ProcOdtOff |
| 11 | TxDqsDll control per Channel per DIMM per Byte |
| 12 | TxDqDll control per Channel per DIMM per Byte |
| 13 | RxEnDll control per Channel per DIMM per Byte |
| 14 | RxDqsLDll control per Channel per DIMM per nibble (used in x4 and x8 DIMM types) |
| 15 | RxDqsUDll control per Channel per DIMM per nibble (used in x4 DIMM types) |
| 16 | AddrCmdDll control per Channel |
| 17 | CsOdtDll control per Channel |
| 18 | CkeDll control per Channel |
| 19 | MemClkDll control per Channel per DIMM pair |

In this example, programming of the relevant fields of the Phy interface is accomplished by issuing commands or programming specific fields in CSRs via the configuration bus 80. For example, changing from one PhyPS to another may be accomplished with a single command issued to the DDR Phy interface indirect register space. Programming of PhyPS context sensitive CSRs may be accomplished by setting the appropriate PhyPS context and then performing normal indirect CSR writes or reads. Alternatively, direct CSR writes or reads may reach any CSR without regard to the PhyPS context.

The Phy interface may be controlled via a series of commands including: Master_0x08[12]—PhyPS, Master_0x08[8]—PstateToAccess and Master_0x18[8]—PhyPSMasterChannel. The nomenclature [12], [8] and the like refers to the bit position within the command. The Master_0x08[12] command corresponds to the current Phy interface P-state (0 or 1). This command controls power context (e.g., which set of CSRs) is currently active. The Master_0x08[8] command selects which P-State to read or write to during CSR accesses. BIOS may use this method to control which P-State to write to without having to do an actual P-State change. It should be understood that additional bits may be added to support more than two power contexts. The Master_0x18[8] command selects the master channel. In this embodiment, only the channel designated by this bit (master channel) is allowed to issue 0x0B[PhyPS Change] commands. Any 0x0B[PhyPS change] commands issued from other channels will be ignored. It should be understood that additional bits may be added to support more than two channels. In this embodiment, the following 0x0B commands are defined:

TABLE 2

| No. | Description |
|---|---|
| 1 | Change PhyPS |
| 2 | Enter and exit PhySR (Self Refresh) |
| 3 | DDR rate change (i.e., change the DDR PLL frequency) |
| 4 | Update other Phy interface sub modes (via sub commands) |
| 5 | ~PwrOk default settings |

The full 0x0B data packet is shown below in Table 3

TABLE 3

| Bit Position | Description |
|---|---|
| 31 | PhySRRequest (Self Refresh) |
| 30 | PhyPSRequest |
| 29-27 | Reserved |
| 26 | PhyPS = <Desired Phy interface Power State> The association of PhyPS 0 or 1 with low power or high power modes (low DDR rate or high DDR rate respectively) is arbitrary from the perspective of the Phy. In this example PhyPS1 is defined as the low power state and PhyPS0 as the high power state. |
| 25-24 | PhySR Pll Control |
| 23 | PhySR |
| 22-18 | Reserved |
| 17-16 | DdrRate |
| 15-4 | Reserved |
| 3 | DdrRateRequest |
| 2-0 | DdrRate |

In this example, the power context is selected via a single bit (i.e., PhyPS[0] and PhyPS[1]-bit position 26). It should be understood that additional bits may be added to support more than two contexts. The PhyPSRequest bit (bit position 30) is used to indicate that the command includes a context change. The power context may generally be changed as follows. Upon receipt of a context change request, each active channel is placed in self refresh (SR) mode 0x0B[PhySR=1]). In this "safe mode", the memory devices use an on-chip timer to generate internal refresh cycles as necessary. Depending on the SR mode selected, external clocks may be stopped during this time. The entry into SR mode may happen at different times but all channels should be in SR mode before the context change. The power context change is initiated (0x0B [PhyPS=X], [PhyPSRequest=1]). Each of the active channels are switched from SR mode to normal mode (0x0B [PhySR=0]).

Upon receipt of the context change command, the Phy interface will change the PhyPS context, the DDR PLL multiplier and divider will be updated, and the PLL will be relocked. When this is all complete, CfgDone will be set. When SR mode is subsequently exited the DLLs will relock. During the time the PhyPS change is occurring the memory controller maintains control over all inputs to the Phy interface (specifically CKE, MemReset, ReadPending, WritePending, all other tri-state controls).

It is generally expected that PhyPS changes will leave the PLL powered up, because the intention is to change PhyPS as quickly as possible. Thus, the change of PhyPS will trigger the PLL relock (and wait for relock) immediately, with the DLL relock happening after the SR is exited. However, it is possible to be in a SR mode which has powered down the PLL (either VCO or regulator), and to change PhyPS while in this SR mode. In this case, the Phy interface will still wait for a PLL relock time immediately after the PhyPS change, but on the subsequent SR exit, the Phy interface will wait for both PLL relock (because the PLL will be in the process of powering back up) and DLL relock.

The 0x0B command to enter and exit Phy interface Self Refresh (PhySR) may be issued in either channel 0 or 1; making it possible to have one DRAM channel in SR mode while the other is not. In order to fully power down the PClk global grid in the Phy, both channel 0 and 1 need to be in PhySR. The 0x0B to change PhySR is shown in Table 4 below:

TABLE 4

| Bit Position | Description |
|---|---|
| 31 | PhySRRequest (Self Refresh) |
| 30 | PhyPSRequest = 0 |
| 29-27 | N/A |
| 26 | PhyPS = <Desired Phy interface Power State> = X |
| 25-24 | PhySR Pll Control {Regulator PD, VCO PD} |
| 23 | PhySR = 1 to enter PhySR, 0 to exit |
| 22-0 | N/A |

Setting 0x0B[31=PhySRRequest] along with 0x0B[23=PhySR] causes the Phy interface to either enter or exit self refresh. 0x0B[25:24] control the behavior of the PLL while in SR. Entry into SR mode is very quick, taking ~300 ns from receipt of the 0x0B command to the time CfgDone is asserted. To allow the memory controller to move forward as quickly as possible, the memory controller may monitor CfgDone for a transition from 1 to 0. This indicates the Phy interface has closed off input from the memory controller, driving all CKE low, driving MemReset appropriately and placing all remaining DDR bus pins into tristate. At this point it is safe for the memory controller to go insane. It is not safe to drop the Vddr rail until CfgDone has asserted, indicating all necessary CSR transactions are complete.

Exit from PhySR is much more latent, requiring that the Phy interface clock grid (PClk) be turned back on and the DLLs relocked. The PLL may be left on or turned off during SR. In this embodiment, 0x0B[30=PhyPSRequest] must be 0 when executing a PhySR change. Setting either 0x0B[31=PhySRRequest] or 0x0B[30=PhyPSRequest] disables 0x0B[22:0] meaning it is not possible to set 0x0B[3=DdrRateRequest] to update the DDR rate field. The DDR rate is set first to load the CSRs containing the Phy interface PLL multiplier and divider. Sending 0x0B[PhyPS change] will load the DDR PLL multiplier and dividers. In other embodiments, it may be possible to execute multiple high level 0x0B commands at once. If 0x0B[31=PhySRRequest]=1 and 0x0B[23=PhySR] results in no change to the PhySR state, the DLL lock times are still obeyed before asserting CfgDone.

In this embodiment, the 0x0B command for the DRAM data rate on the DDR bus is set by BIOS in channel 0 only. Sending 0x0B commands to set the DRAM data rate in channel 1 has no effect. It should be understood that other embodiments may support independent DDR data rates on each channel. The 0x0B DDR rate command is shown in Table 5 below:

TABLE 5

| Bit Position | Description |
|---|---|
| 31 | PhySRRequest = 0 |
| 30 | PhyPSRequest = 0 |
| 29-27 | Reserved |
| 26 | PhyPS = <Desired Phy interface Power State> = X |
| 25-24 | PhySR Pll Control = X |
| 23 | PhySR = X |
| 22-18 | Reserved |

TABLE 5-continued

| Bit Position | Description |
|---|---|
| 17-16 | DdrRate[4:3] |
| 15-4 | Reserved |
| 3 | DdrRateRequest = 1 |
| 2-0 | DdrRate[2:0] = Set to the desired Rate |

Changing the actual DDR rate and PLL frequency through this 0x0B[DdrRate] command is included for legacy BIOSes. BIOSes that understand Phy interface P-States should instead program the DDR Rates for both Phy interface PStates through the direct CSRs Master 0x00[DdrRate] and Master 0x40[DdrRate]. These rate changes (through the direct CSRs) will only take affect after a subsequent 0x0B[PhyPS change].

In this embodiment, 0x0B[31=PhySRRequest] and 0x0B[30=PhyPSRequest] must both be 0 when executing an update to the DDR rate. It should be understood that embodiments may support multiple high level 0x0B commands at once.

The PhyPS state after cold reset, warm reset, or Advanced Configuration and Power Interface (ACPI) power state S3 (commonly referred to as Standby, Sleep, or Suspend to RAM) are shown in Table 6 below. All states are persistent through warm reset. Therefore, in the warm reset entries below, the values remain as they were prior to the warm reset.

TABLE 6

| Channel population | Event | Defaults if both PhyPS are supported | Defaults if only one PhyPS is supported |
|---|---|---|---|
| Channel 0 only | cold reset | PhyPS = 0 | PhyPS = 0 |
| | warm reset | PStateToAccess = 0<br>PhyPSMasterChannel = 0<br>PhySR = 0 (all channels)<br>PhyPS = 0 or 1 | PStateToAccess = 0<br>PhyPSMasterChannel = 0<br>PhySR = 0 (all channels)<br>PhyPS = 0 |
| | | PStateToAccess = 0 or 1<br>PhyPSMasterChannel = 0<br>PhySR = 0 or 1<br>(channel 0)<br>PhySR = 1<br>(channel 1) | PStateToAccess = 0<br>PhyPSMasterChannel = 0<br>PhySR = 0 or 1<br>(channel 0)<br>PhySR = 1<br>(channel 1) |
| | S3 | Same as cold reset same as cold reset | Same as cold reset same as cold reset |
| Channel 1 only | cold reset | PhyPS = 0 | PhyPS = 0 |
| | warm reset | PStateToAccess = 0<br>PhyPSMasterChannel = 0<br>PhySR = 0 (all channels)<br>PhyPS = 0 or 1 | PStateToAccess = 0<br>PhyPSMasterChannel = 0<br>PhySR = 0 (all channels)<br>PhyPS = 0 |
| | | PStateToAccess = 0 or 1<br>PhyPSMasterChannel = 0<br>PhySR = 1<br>(channel 0)<br>PhySR = 0 or 1<br>(channel 0) | PStateToAccess = 0<br>PhyPSMasterChannel = 0<br>PhySR = 1<br>(channel 0)<br>PhySR = 0 or 1<br>(channel 0) |
| | S3 | Same as cold reset same as cold reset | Same as cold reset same as cold reset |
| Both Channels | cold reset | PhyPS = 0 | PhyPS = 0 |
| | warm reset | PStateToAccess = 0<br>PhyPSMasterChannel = 0<br>PhySR = 0 (all channels)<br>PhyPS = 0 or 1 | PStateToAccess = 0<br>PhyPSMasterChannel = 0<br>PhySR = 0 (all channels)<br>PhyPS = 0 |
| | | PStateToAccess = 0 or 1<br>PhyPSMasterChannel = 0<br>PhySR = 0 or 1<br>(channel 0)<br>PhySR = 1 | PStateToAccess = 0<br>PhyPSMasterChannel = 0<br>PhySR = 0 or 1<br>(channel 0)<br>PhySR = 1 |

TABLE 6-continued

| Channel population | Event | Defaults if both PhyPS are supported | Defaults if only one PhyPS is supported |
|---|---|---|---|
| | S3 | (channel 1) Same as cold reset same as cold reset | (channel 1) Same as cold reset same as cold reset |

When a typical computer power supply is first energized, it takes some time for the various voltages to stabilize. Before the voltages stabilize, if the computer were allowed to try to boot up, unpredictable results could occur. To prevent the computer from starting up prematurely, the power supply outputs a PwrOK signal when the power supply is ready for use. Until this signal is sent, the motherboard will refuse to start up the computer.

When cold booting (~PwrOk asserted as well as Reset asserted) the PhyPS will automatically be set to 0 and the Phy interface will not be in PhySR (all DLLs will be powered up). When warm booting (PwrOk continuously asserted, only Reset asserted) the PhyPS and PhySR state will be determined by the state just before warm reset. Resuming from a warm reset requires BIOS to set the appropriate PhyPS and PhySR states (a time optimized solution is to perform a direct CSR read of these states and then perform a write if necessary). The BIOS should ensure that the Phy interface is not in SR mode after a warm reset.

Since DDR3 requires a two pass training procedure to have an unambiguous convergence of Write Levelization (WL) and RxEn, it is possible to train for the lower-frequency PState as part of the process of training for the higher-powered PState. The procedure also assumes that BIOS has already determined that this is a cold reset (and thus requires training), as opposed to a warm reset or S3 exit.

First pass of memory training uses the initial DDR rate required for unambiguous training as shown in Table 7 below. It should be understood that the specific sequence of steps set out in all of the tables below may be varied without departing from the scope of this disclosure.

TABLE 7

| | Description |
|---|---|
| 1 | Perform the following procedure for channels with memory. Place any channels without memory into SR and do nothing else to these channels. |
| 2 | Configure the relevant memory controller register space. |
| 3 | Place all active channels into SR. (optional) |
| 4 | Program the DDR rate to the target rate. |
| 5 | Set all active channels to normal mode (i.e., take channels out of SR). DLLs will be relocked. |

At this point the DDR PLL and DLLs are properly configured for use. The PhyPS context is PhyPS0. Both channels, if memory is present, are ready to begin training. Training follows the known protocols such as the AMD Generic Encapsulated Software Architecture (AGESA) bootstrap protocol as shown generally in Table 8:

TABLE 8

| | Description |
|---|---|
| 6 | Set all Drive Strengths fields. |
| 7 | Set NB_TxChnClkEn, perform hardware-based fence training, note and set the final FenceValue. |
| 8 | Set Address/Bank/RAS/CAS/WE/MemClk Dll launch delay. |
| 9 | Set Cs & Odt Dll launch delay. |

TABLE 8-continued

| | Description |
|---|---|
| 10 | Set Cke Dll launch delay. |
| 11 | Execute DRAM init. |
| 12 | Perform hardware-based WL training using default constants. |
| 13 | Perform hardware-based RxEn training using default constants. |
| 14 | Perform TxDq/RxDqs write/read training. |
| 15 | MRL training may occur here or it may occur later. NCLK must be running at the eventual target speed for this DDR rate. |

At this point, the training and programming of the initial DDR rate for unambiguous training is complete. This DDR rate and other parameters established during this initial training protocol may be used as a first power context (e.g., lower speed—PhyPS[1]). It should be understood that PhyPS[1] may be set based on another DDR rate (i.e., repeat steps 4 through 15 for this frequency). The next phase trains for the higher (PhyPS[0]) DDR rate. The pass(es) above resolved aliasing in the Write Levelization and RxEn hardware training algorithm. The Write Levelization and RxEn training values are scaled by the MemClk data rate ratio PhyPS0/PhyPS1 and used as the seed for the second phase of training in PhyPS[0]. The procedure is initiated as shown in Table 9.

TABLE 9

| | Description |
|---|---|
| 16 | Place all active channels into SR. (optional) |
| 17 | Program the DDR rate to the desired PhyPS[0] DDR rate. |
| 18 | Set all active channels to normal mode (i.e., take channels out of SR). DLLs will be relocked. |

At this point the DDR PLL and DLLs are properly configured for use. The PhyPS context is still PhyPS[0], and the Phy interface is running at the PhyPS[0] DDR Rate. Both channels, if memory is present, are ready to begin the next phase of training as shown generally in Table 8:

TABLE 10

| | Description |
|---|---|
| 19 | Set all Drive Strengths fields. |
| 20 | Set NB_TxChnClkEn, perform hardware-based fence training, note and set the final FenceValue. |
| 21 | Set Address/Bank/RAS/CAS/WE/MemClk Dll launch delay. |
| 22 | Set Cs & Odt Dll launch delay. |
| 23 | Set Cke Dll launch delay. |
| 24 | Execute DRAM init. |
| 25 | Perform hardware-based WL training using default constants. |
| 26 | Perform hardware-based RxEn training using default constants. |
| 27 | Perform TxDq/RxDqs write/read training. |
| 28 | MRL training may occur here or it may occur later. NCLK must be running at the eventual target speed for this DDR rate. |

This completes second phase training and programming of power context—PhyPS[0]. At this stage, the rates for both PhyPS spaces have been trained, and trained values are already written to the Phy interface PhyPS[0] CSRs as part of the training. The Phy interface is currently in the PhyPS[0] context. The PhyPS[1] trained values have been trained but not yet written to the PhyPS[1] CSRs. The PhyPS[0] CSRs are updated as shown generally in Table 11:

TABLE 11

| | Description |
|---|---|
| 29 | Write a 1 to Master_0x08[PStateToAccess] - PhyPS[1] |
| 30 | Write the stored PhyPS1 trained values to the PhyPS1 CSRs |
| 31 | Write a 0 to Master_0x08[PStateToAccess] - PhyPS[0] |

In the event only one PhyPS is required, BIOS may choose which PhyPS context should be used. In order to preserve historical meaning, BIOS may configure the Phy interface for PhyPS[0].

Resumption from S3 does not involve any DRAM training, only restoring the trained values from nonvolatile state (generally in the South Bridge). Resumption from S3 will typically guarantee (because of ~PwrOk) that the PhyPS context is PhyPS0, Master 0x08[PStateToAccess] is 0, that both channels are out of PhySR, and that the master channel is channel 0 (even if memory is not present on channel 0). The procedure for resuming from S3 are generally shown in Table 12:

TABLE 12

| | Description |
|---|---|
| 1 | Put all active channels into SR. |
| 2 | If there is no memory on channel 0, set Master_0x18[PhyPSMasterChannel] (see 3.7) to ensure PhyPS changes being issued on channel 1 by the only active DCT have effect. Note that if memory is not present on channel 1, no action is required because Master_18[PhyPsMasterChannel] should be left at the default of channel 0. |
| 3 | With the Phy interface in PhyPS0 due to ~PwrOk being issued while in S3, restore all of the PhyPS0 trained and derived values. |
| 4 | Update the DDR rate with the PhyPS0 rate. |
| 5 | Write a 1 to Master_0x08[PStateToAccess] in the master channel. This means that all PCI accesses will now be directed at PhyPS=1. |
| 6 | Restore all PhyPS1 trained and derived values. |
| 7 | Update the DDR rate with the PhyPS1 rate. Now both sets of PhyPS CSRs are restored and ready. |
| 8 | Issue a 0x0B[PhyPS change to the desired PhyPS] in the master channel. This will update the DDR PLL to the desired PhyPS rate. Wait for CfgDone to assert. |
| 9 | Take all active channels out of SR. Leave unpopulated channels in SR. The DLLs are relocked. The Phy interface is now ready to operate in either PhyPS, and is currently in the requested PhyPS |

A warm reset resume is almost identical to a resume from S3. Resume from S3 has ~PwrOk set the PhyPS context to PhyPS0, designate channel 0 as the master channel to communicate PhyPS changes and take the Phy interface out of PhySR in both channels. In contrast, warm reset leaves the PhyPS and PhySR as well as master channel in an unknown state. It should be further noted that an architectural hole exists with a warm reset resume. If a warm reset resume is issued before the system may cold boot, complete memory training and store all trained values in non-volatile memory, the resume will fail. In order to avoid this issue, BIOS should use a flag (which is reset on cold reset but persistent through warm reset) to indicate whether the training values have been calculated and stored successfully—if during a warm reset, BIOS sees this flag set, it may resume by restoring the trained state. The trained state also includes the Master 0x18[PhyPS-MasterChannel] as well as any unpopulated channel is left in SR mode. If this flag is not set then BIOS must (re)train the Phy. For purposes of the following disclosure, it is assumed that this flag has been set and that training values have been stored. Therefore warm reset resume does not involve any DRAM training, only restoring the trained values from non-volatile state (generally in the South Bridge). The procedure for performing a warm reset resume are generally shown in Table 13:

TABLE 13

| | Description |
|---|---|
| 1 | Put all active channels into SR. |
| 2 | BIOS determines which channel is the master channel accepting PhyPS changes. Subsequent accesses to Master_0x08[PStateToAccess] or 0x0B[PhyPS] commands by the BIOS should be directed to the master channel. |
| 3 | Select PhyPS[0] (Master_0x08[PStateToAccess] = 0) |
| 4 | Restore all PhyPS0 trained and derived values. |
| 5 | Update the DDR rate to the PhyPS[0] rate. |
| 6 | Select PhyPS[1] (Master_0x08[PStateToAccess] = 1) |
| 7 | Restore all PhyPS1 trained and derived values. |
| 8 | Update the DDR rate to the PhyPS1 rate. |
| 9 | Issue a 0x0B[PhyPS change to desired PhyPS] in the master channel. This will update the DDR PLL to the desired PhyPS rate. Wait for CfgDone to assert. |
| 10 | Take all active channels out of SR. This will relock the DLLs. |

Table 14 shows a list of all PhyPS CSRs that are duplicated for each power context:

TABLE 14

| | Description |
|---|---|
| 1 | Master_0x00[Config0] for PhyPS0 |
| 2 | Master_0x40[Config0] for PhyPS1 |
| 3 | Master_0x01[Config1] for PhyPS0 |
| 4 | Master_0x41[Config1] for PhyPS1 |
| 5 | Master_0x02[AddrCmdCke] for PhyPS0 |
| 6 | Master_0x42[AddrCmdCke] for PhyPS1 |
| 7 | Master_0x03[PllDiv, PllMult, PllDiv2Bypass, PllUpdate] will now be for PhyPS0 PLL control |
| 8 | Master_0x43[PllDiv, PllMult, PllDiv2Bypass, PllUpdate] will now be for PhyPS1 PLL control |
| 9 | 8:0.DByte_0x{00,04,08} are the PhyPS0 DS and POdt control |
| 10 | 8:0.DByte_0x{40,44,48} are the PhyPS1 DS and POdt control |
| 11 | 8:0.DByte_0x0C is the PhyPS0 Dll & Pre Config |
| 12 | 8:0.DByte_0x0C is the PhyPS1 Dll & Pre Config |
| 13 | 8:0.DByte_0x{10,11} are the PhyPS0 Dll Power Management |
| 14 | 8:0.DByte_0x{50,51} are the PhyPS1 Dll Power Management |
| 15 | 8:0.DByte_0x13 is the PhyPS0 Dll DByte Config |
| 16 | 8:0.DByte_0x53 is the PhyPS1 Dll DByte Config |
| 17 | 8:0.DByte_0x{14,15,16,17}[RxDQS Early/Late Select] for PhysPS0 |
| 18 | 8:0.DByte_0x{54,55,56,57}[RxDQS Early/Late Select] for PhysPS1 |
| 19 | 8:0.DByte_0x{18,19,1A,1B}[RxDQS Early Delay] for PhysPS0 |
| 20 | 20. 8:0.DByte_0x{58,59,5A,5B}[RxDQS Early Delay] for PhysPS1 |
| 21 | 8:0.DByte_0x1E [Bias Control] for PhysPS0 |
| 22 | 8:0.DByte_0x5E [Bias Control] for PhysPS1 |
| 23 | 8:0.DByte_0x1F [Receiver Control] for PhysPS0 |
| 24 | 8:0.DByte_0x5F [Receiver Control] for PhysPS1 |
| 25 | 8:0.DByte_0x{20,21,22,23} for RxDqs Late Delay {0,1,2,3} for PhyPS0 |
| 26 | 8:0.DByte_0x{60,61,62,63} for RxDqs Late Delay {0,1,2,3} for PhyPS1 |
| 27 | 8:0.DByte_0x{24,25} for DllTxDqs for PhyPS0 |
| 28 | 8:0.DByte_0x{64,65} for DllTxDqs for PhyPS1 |
| 29 | 8:0.DByte_0x{26,27} for DllRxEn for PhyPS0 |
| 30 | 8:0.DByte_0x{66,67} for DllRxEn for PhyPS1 |
| 31 | 8:0.DByte_0x{28,29} for DllTxDq for PhyPS0 |
| 32 | 8:0.DByte_0x{68,69} for DllTxDq for PhyPS1 |
| 33 | 8:0.DByte_0x{2A,2B} for DllTxUDQS for PhyPS0 |
| 34 | 8:0.DByte_0x{6A,6B} for DllTxUDQS for PhyPS1 |
| 35 | 8:0.DByte_0x{2C,2D} for DllTxUDq for PhyPS0 |
| 36 | 8:0.DByte_0x{6C,6D} for DllTxUDq for PhyPS1 |
| 37 | 3:0.MemCk_0x00[TX Config/DS] are the PhyPS0 DS |
| 38 | 3:0.MemCk_0x40[TX Config/DS] are the PhyPS1 DS |
| 39 | 3:0.MemCk_0x1E[Bias Control] are the PhyPS0 DS |
| 40 | 3:0.MemCk_0x5E[Bias Control] are the PhyPS1 DS |
| 41 | 3:0.MemCk_0x20[Dll delay/config] for PhyPS0 |
| 42 | 3:0.MemCk_0x60[Dll delay/config] for PhyPS1 |

TABLE 14-continued

| | Description |
|---|---|
| 43 | 0:1.CsOdt_0x{00,04,08}[OdtCfg,CsCfg0145,CsCfg2367] are the PhyPS0 DS |
| 44 | 0:1.CsOdt_0x{40,44,48}[OdtCfg,CsCfg0145,CsCfg2367] are the PhyPS1 DS |
| 45 | 0:1.CsOdt_0x1E [Bias Control] for PhyPS0 |
| 46 | 0:1.CsOdt_0x5E [Bias Control] for PhyPS1 |
| 47 | 0:1.CsOdt_0x{20,21} [Dll delay/config] for PhyPS0 |
| 48 | 0:1.CsOdt_0x{60,61} [Dll delay/config] for PhyPS1 |
| 49 | A2Byt_0x{00,04,08,0C,10}[A2CfgCke,A2Cfg0189,A2Cfg23AB, A2Cfg45CD,A2Cfg67EF] are the PhyPS0 DS |
| 50 | A2Byt_0x{40,44,48,4C,50}[A2CfgCke,A2Cfg0189,A2Cfg23AB, A2Cfg45CD,A2Cfg67EF] are the PhyPS1 DS |
| 51 | A2Byt_0x1E [Bias Control] for PhyPS0 |
| 52 | A2Byt_0x5E [Bias Control] for PhyPS1 |
| 53 | A2Byt_0x{20,21} [Dll delay/config] for PhyPS0 |
| 54 | A2Byt_0x{60,61} [Dll delay/config] for PhyPS1 |
| 55 | D3Cmp_0x02 [Predriver slew rate] for PhyPS0 |

It should be understood that many variations are possible based on the disclosure herein. For example, multiple power contexts could be stored in other memory locations (e.g., in the north bridge 14 or south bridge 16). In this scenario, a standard Phy interface could switch power contexts without the need for a dedicated set of context sensitive CSRs. Such a scenario could eliminate the need for multiple sets of CSRs but would increase the latency for the context change.

Although features and elements are described above in particular combinations, each feature or element may be used alone without the other features and elements or in various combinations with or without other features and elements. The methods or flow charts provided herein may be implemented in a computer program, software, or firmware incorporated in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors may be manufactured by configuring a manufacturing process using the results of processed hardware description language (HDL) instructions (such instructions capable of being stored on a computer readable media). The results of such processing may be maskworks that are then used in a semiconductor manufacturing process to manufacture a processor which implements aspects of the present invention.

What is claimed is:

1. A method of controlling a physical memory interface for a memory device, the method comprising:
   responsive to receiving a power context change request, selecting a power context based on the power context change request; and
   configuring a plurality of adjustable delay elements to provide timing delays for reading data from and writing data to the memory device, each adjustable delay element having a delay time corresponding to the power context.

2. The method of claim 1 includes configuring a plurality of drivers each having a drive strength corresponding to the power context.

3. The method of claim 1 wherein said power context is one of a plurality of power contexts corresponding to a plurality of power states such that selecting the power context in response to the power context change requests results in changing power demand.

4. The method of claim 1 includes configuring a plurality of receivers each having a termination impedance corresponding to the power context.

5. The method of claim 1 wherein selecting the power context includes selecting a set of physical memory interface parameters associated with a power state.

6. The method of claim 2 includes configuring a plurality of receivers each having a termination impedance corresponding to the power context.

7. The method of claim 1 wherein:
   selecting the power context includes selecting a set of physical memory interface parameters associated with a power state and;
   said physical memory interface parameters include delay time parameters, drive strength parameters and termination impedance parameters.

8. A physical memory interface for a memory device, the physical memory interface comprising:
   a plurality of registers configured to store at least two power contexts;
   selection circuitry for selecting one of the at least two power contexts; and
   a plurality of adjustable elements for providing varying levels of performance for accessing the memory device, each adjustable element is configured to a level of performance by a physical memory interface parameter corresponding to the selected power context.

9. The physical memory interface of claim 8, wherein the plurality of adjustable elements includes a plurality of adjustable delay elements to provide timing delays for reading data from and writing data to the memory device, each adjustable delay element having a delay time corresponding to the selected power context.

10. The physical memory interface of claim 9, wherein the plurality of adjustable elements includes a plurality of drivers each having a drive strength corresponding to the selected power context.

11. The physical memory interface of claim 10, wherein the plurality of adjustable elements includes a plurality of receivers each having a termination impedance corresponding to the selected power context.

12. The physical memory interface of claim 10, wherein:
   the selected power context includes a set of physical memory interface parameters associated with a power state and;
   the physical memory interface parameters include delay time parameters, drive strength parameters and termination impedance parameters.

13. The physical memory interface of claim 8, wherein the plurality of adjustable elements includes a plurality of drivers each having a drive strength corresponding to the selected power context.

14. The physical memory interface of claim 8, wherein the plurality of adjustable elements includes a plurality of receivers each having a termination impedance corresponding to the selected power context.

15. The physical memory interface of claim 8, wherein the selected power context is associated with a power state.

16. The physical memory interface of claim 8, wherein said at least two power contexts are a plurality of power contexts corresponding to a plurality of power states such that selecting the power context results in changing power demand.

17. A computer readable non-transitory medium including instructions which when executed in a processing system cause the system to provide control of a physical memory interface for a memory device comprising:
   responsive to receiving a power context change request, selecting a power context based on the power context change request; and
   configuring a plurality of adjustable delay elements to provide timing delays for reading data from and writing data to the memory device, each adjustable delay element having a delay time corresponding to the power context.

18. The medium of claim 17 includes configuring a plurality of drivers each having a drive strength corresponding to the power context.

19. The medium of claim 18 includes configuring a plurality of receivers each having a termination impedance corresponding to the power context.

20. The medium of claim 17 includes configuring a plurality of receivers each having a termination impedance corresponding to the power context.

* * * * *